(12) United States Patent
Sampath et al.

(10) Patent No.: US 8,574,350 B2
(45) Date of Patent: Nov. 5, 2013

(54) WATER SEPARATION SYSTEMS AND METHODS

(75) Inventors: Vasudevan Sampath, Houston, TX (US); Ivan Mantilla, Katy, TX (US); Carlos Avila, Houston, TX (US); Gene Kouba, Katy, TX (US); John Strader, Livermore, CA (US); John D. Marrelli, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 233 days.

(21) Appl. No.: 12/973,029

(22) Filed: Dec. 20, 2010

(65) Prior Publication Data

US 2012/0152121 A1   Jun. 21, 2012

(51) Int. Cl.
*B01D 19/00* (2006.01)

(52) U.S. Cl.
USPC .................. 95/253; 95/261; 96/182; 96/156; 96/204

(58) Field of Classification Search
USPC ............... 95/253, 261, 259; 96/182, 156, 204
See application file for complete search history.

(56) References Cited

U.S. PATENT DOCUMENTS

| | | | | |
|---|---|---|---|---|
| 4,948,393 A | * | 8/1990 | Hodson et al. | 95/250 |
| 5,302,294 A | * | 4/1994 | Schubert et al. | 210/702 |
| 5,366,641 A | * | 11/1994 | Hadfield et al. | 210/739 |
| 6,132,494 A | * | 10/2000 | Kjos et al. | 95/243 |
| 6,730,236 B2 | * | 5/2004 | Kouba | 210/806 |
| 2008/0006011 A1 | | 1/2008 | Larnholm et al. | |
| 2008/0087608 A1 | | 4/2008 | Wang et al. | |

OTHER PUBLICATIONS

Mathiravedu, et al.; "Performance and Control of Liquid-Liquid Cylindrical Cyclone Separators," Journal of Energy Resources Technology, vol. 132, Mar. 2010, 9 pages.
Wang, et al; "Compact Multiphase Incline Water Separation (IWS) System—A New Approach for Produced Water Management and Production Enhancement," SPE104252, Society of Petroleum Engineers, 2006, 7 pages.
Mathiravedu, Rajkumar S., "Control System Development and Performance Evaluation of LLCC Separators," The University of Tulsa The Graduate School, 2001, 182 pages.
Avila, Carlos, "Modeling and Control Systems Development for Integrated Three-Phase Compact Separators," The University of Tulsa The Graduate School, 2003, 165 pages.
Co-Pending U.S. App. No. 12/973,131, filed Dec. 20, 2010 and titled "Water Separation Systems and Methods"—Chevron File T-8152.
International Search Report and Written Opinion for PCT/US2011/045872 dated Apr. 6, 2012, 8 pages.

* cited by examiner

*Primary Examiner* — Duane Smith
*Assistant Examiner* — Douglas Theisen
(74) *Attorney, Agent, or Firm* — John E. Vick

(57) ABSTRACT

A water separation system and method for treating multiphase hydrocarbon production streams is disclosed. The system may be employed to separate gas from the production stream, and then separate the liquid stream into its oil component and water component. A gas/liquid separator may be employed to separate a multiphase hydrocarbon production stream into a gas stream and a liquid stream. A liquid cyclone separator, positioned downstream from the gas/liquid separator, may be employed to divide the liquid stream into an oil dominated portion and a water dominated portion. The system may be used on land or on offshore platforms in locations where it is desirable to separate oil and water from hydrocarbon streams.

22 Claims, 6 Drawing Sheets

WATER SEPARATION SYSTEMS AND METHODS

CROSS-REFERENCE TO RELATED APPLICATIONS

This application shares a common specification with another application filed concurrently in the United States Patent and Trademark Office, entitled "Water Separation Systems and Methods".

FIELD OF THE INVENTION

The invention is directed to systems and methods for separating water from a multiphase hydrocarbon production stream.

BACKGROUND

Hydrocarbon streams produced from underground formations usually are mixtures of oil, gas and water. The produced oil, gas and water eventually must be separated. The industry is continually searching for more efficient and compact systems and improved methods for achieving separation.

In separating these components, a gas-liquid separation may be followed by a subsequent liquid-liquid separation. Liquid-liquid separation devices may be suitable for either water continuous or oil continuous flow regimes. A water continuous flow employs water as the continuous phase with oil droplets (dispersed phase) held in the water. Alternately, oil continuous flow refers to a stream in which oil serves as the continuous phase, with water droplets being held within the continuous oil phase.

United States Patent Application Publication US 2008/0087608 A1 to Wang et al. describes a method and apparatus for inline controlled water separation. Another publication discloses bulk separation of oil-water mixtures using liquid-liquid cylindrical cyclones. See Mathiravedu, R. S. et al., *Performance and Control of Liquid-Liquid Cylindrical Cyclone Separators*, Journal of Energy Resources Technology, volume 132, page 011011-1 (March 2010).

In conducting oil/water separation in the field there may be competing goals for separation of the liquid stream. That is, it usually a goal to produce a highly pure water stream to achieve regulatory requirements for disposal of water into the environment. At the same time, however, there may be a competing goal to produce an oil stream with the lowest possible amount of water that can be achieved. It has been observed that achieving one of such goals compromises the ability to achieve the other goal. This invention is directed to improved systems and methods for achieving separation of multiphase production streams.

BRIEF SUMMARY

In one application of the invention, a water separation system for treating multiphase hydrocarbon production streams is provided. The system may be comprised of a gas/liquid separator to separate the multiphase hydrocarbon production stream into a gas stream and a liquid stream. In one particular embodiment, the gas/liquid separator may be a cyclonic type of separator. The liquid stream may be comprised of droplets within a continuous phase. Flow conditioners may be provided in fluid communication with and positioned upstream or downstream from the gas/liquid separator. The flow conditioner in this aspect of the invention is positioned downstream from the gas/liquid separator, and may be configured for increasing average droplet size in the fluid flow. The flow conditioner comprises a first section and a second section in some applications. A liquid-liquid cyclone separator or other type of cyclonic separation device may be provided in fluid communication with and positioned downstream from the flow conditioner. The term "liquid-liquid" as used herein refers to the fact that the separator separates one liquid (such as oil) from a second liquid (water). Thus, such a "liquid-liquid separator" also may be referred to herein as: "liquid separator" or "cyclonic separator", "cyclone separator", "hydrocyclone" or "LLCC". LLCC is an acronym for liquid-liquid cylindrical cyclone separator. Thus, each of these descriptions may be employed herein, and refer to the same or similar type of device. The liquid-liquid cyclone separator functions to divide the liquid stream into an oil dominated portion and a water dominated portion.

In some applications of the invention the first section of the flow conditioner comprises a coalescer having a first pipe of enlarged cross-section to reduce the velocity of the liquid stream. A first pipe of the coalescer may be oriented at less than about a 45 degree angle from vertical in some applications of the invention. Furthermore, the first pipe may be oriented substantially vertically in other applications. The inlet to the coalescer may be radial, axial, or tangential depending upon the optimization of droplet coalescence and/or structure requirements. In other applications, the first pipe may not be required at all, or if present, may be provided at some angle between zero degrees and 45 degrees from vertical. The flow conditioner may include a second pipe which in some applications may be oriented substantially horizontally. The second pipe has an enlarged cross-section in some embodiments of the invention. A control system may be provided for adjusting efficiency of separation of the cyclonic separator which selection may change upon the particular application employed.

A control system may be provided with a water quality sensor in communication with a control valve, wherein the control system may act in some instances to redirect a portion of the flow of the liquid stream to achieve a desired oil/water ratio. The water quality sensor may comprise a Coriolis meter, which is a type of mass flow meter that measures mass flow rate and mixture density of the fluid traveling through a conduit. In other embodiments of the invention, microwave or infrared devices may be employed as the water quality sensor. The mixture density value is used to calculate the oil/water ratio based on the pure densities of both oil and water. The flow conditioner may be an inline coalescing element, which may be of any shape or type, including metallic, coated with an outer coating, a polymeric or polymeric matrix, ceramic materials or coatings, or in the form of a plate pack.

A method of separating water from a multiphase hydrocarbon production stream is disclosed. The method may comprise supplying the multiphase hydrocarbon production stream to a gas/liquid separator to separate the multiphase hydrocarbon production stream into a gas stream and a liquid stream. The liquid stream may be comprised of droplets within a continuous phase. It should be noted that there may be oil droplets in water, and there also may be water droplets in oil. Different configurations of the invention may be employed to address both of these situations. The liquid stream may be supplied from the gas/liquid separator to a flow conditioner in fluid communication with and positioned downstream from the gas/liquid separator. The flow conditioner may be configured for increasing the average droplet size in the liquid streams. The liquid stream may proceed from the flow conditioner to a liquid cyclone separator which is capable of dividing the liquid stream into an oil dominated portion and a water dominated portion.

In yet another alternate embodiment of the invention, a water separation system and method is disclosed for treating multiphase hydrocarbon production streams. Such streams may be provided with two liquid-liquid cyclonic separators, in which an output stream from the first cyclonic separator is fed into the second cyclonic separator for further processing. In the system, a gas/liquid separator first may be employed to separate the multiphase hydrocarbon production stream into a gas stream and a liquid stream. The liquid stream may be comprised of droplets within a continuous phase. A first cyclonic separator is in fluid communication with and positioned downstream from the gas/liquid separator. The first cyclonic separator may be capable of dividing the liquid stream into an oil dominated portion and a water dominated portion. The first cyclonic separator is equipped with a nozzle that typically will have a different configuration from that of the nozzle in the second cyclonic separator. The area of opening in the nozzle typically is smaller in the second cyclonic separator. A second cyclonic separator may be provided in fluid communication with and positioned downstream from the first cyclonic separator. The second cyclonic separator, in some instances, is capable of extracting water from the oil dominated portion to further reduce the percentage of water in the oil dominated portion.

The system also may deploy a first control system adapted for adjusting the efficiency of separation in the first cyclonic separator. The first control system further may include a first water quality sensor in communication with a first control valve. The first control system may act to redirect a portion of the flow of the liquid stream to achieve a desired oil/water ratio. A second control system may be adapted for adjusting the efficiency of separation in the second cyclonic separator. A supervisory control system may be employed to keep both control systems in stable and operating range of the both the cyclonic separators. This supervisory control system may utilize the expert fuzzy logic control or gain scheduling to achieve better efficiencies.

It should be recognized that mixed dispersions with droplets of oil in water, droplets of water in oil, and bubbles of gas and even solids may appear in the fluids processed by the system of the invention. Thus, the invention may be operated with mixed dispersions.

A second control system may be deployed in connection with the alternate embodiment of the invention, including a second water quality sensor in communication with a second control valve. The second control system may act to redirect a portion of the flow of the oil dominated portion to achieve a desired oil/water ratio. The flow conditioner may be in fluid communication with and positioned downstream from the gas/liquid separator and upstream from the first cyclonic separator. The flow conditioner may be configured for increasing average droplet size, and it may be divided into a first coalescer section and a second coalescer section. The first section may include a first pipe of enlarged cross-section to reduce the velocity of the liquid stream, while the second section may include a second pipe. The second pipe may be, or may not be, of enlarged cross-section, depending upon the configuration employed. The first pipe of the coalescer may be oriented at less than a 45 degree angle from vertical. In other applications, the first pipe may be oriented substantially vertically. The second coalescing section of the flow conditioner may be provided with a second pipe, which in some instances may be oriented substantially horizontally. The second pipe may or may not be of enlarged cross-section. The flow conditioner additionally may provide an inline coalescing element. The inline coalescing element may be of many different configurations, including: metallic, ceramic, polymeric media, coated, or in the form of a plate pack or the like.

In other applications of the invention, a method is provided of separating water from a multiphase hydrocarbon production stream in which at least two liquid-liquid cyclonic separators are employed. The method includes supplying the multiphase hydrocarbon production stream to a gas/liquid separator to separate the multiphase hydrocarbon production stream into a gas stream and a liquid stream. Then, the liquid stream, which may comprise droplets within a continuous phase may be sent to a first liquid separator in fluid communication with and positioned downstream from the gas/liquid separator, the first liquid-liquid cyclonic separator being capable of dividing the liquid stream into an oil dominated portion and a water dominated portion. Then, the oil dominated portion may be delivered to a second cyclonic separator in fluid communication with and positioned downstream from the first cyclonic separator. The second cyclonic separator extracts water from the oil dominated portion to further reduce the percentage of water. It should be noted that the flow conditioner may act to increase the average droplet size in the liquid stream before the liquid stream passes to the first cyclonic separator. In the method, an inline coalescing element may be employed. Such element may be metallic, coated, or in the form of a plate pack.

BRIEF DESCRIPTION OF THE FIGURES

Various aspects of the invention may be observed in more detail by reference to one or more Figures as follows.

DETAILED DESCRIPTION

Figure 1:
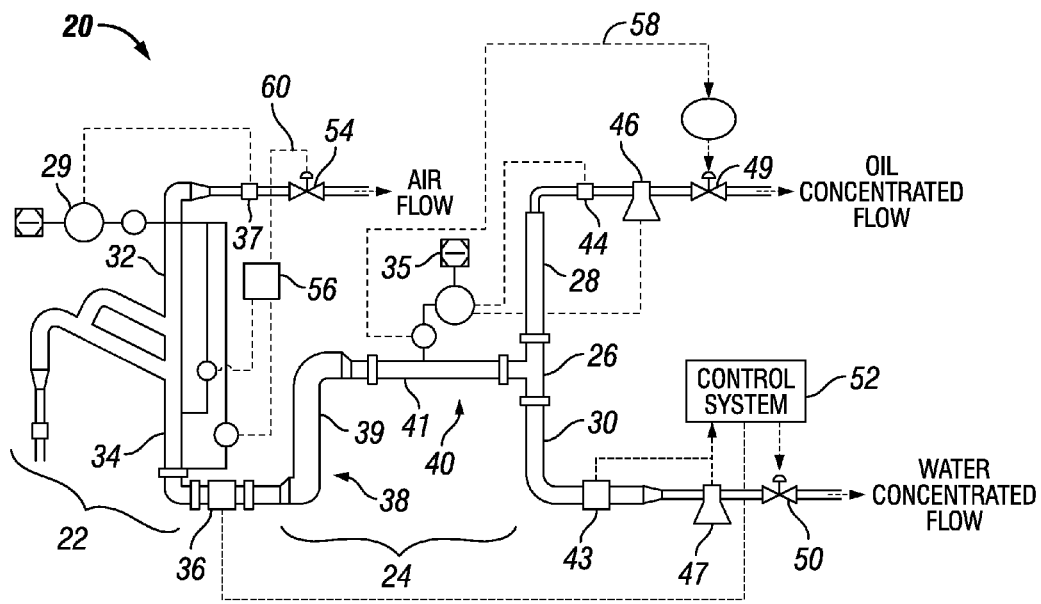
FIG. 1 shows a schematic of one embodiment of the invention for separating water from a multiphase hydrocarbon production stream.

A liquid-liquid cylindrical cyclone ("LLCC"), a type of cyclonic separator, is a fairly compact vertically installed pipe mounted with a horizontal inlet. The oil-water mixture is introduced through a tangential slot from the inlet. This type of cyclone typically has two fluid exits: (1) the upper outlet that flows an oil rich stream, and (2) the lower outlet that flows a water rich stream. It does not have moving parts or internal mechanical mechanisms, which assists in terms of maintenance and operational efficiency. Separation occurs by way of centrifugal forces caused by the swirling motion induced by the tangential inlet slot, combined with gravitational forces. Heavier dense water is forced radially towards the cyclone wall and downward, and is collected near the lower portion of the unit. Lighter oil moves towards the center of the cyclone and upwards, and it is taken out from the top portion of the device.

The operation of a cyclonic separator may be limited by two phenomena, that is: (1) oil carry-under in the underflow (i.e. oil carrying over with the clear water stream) and also (2) water carry-over in the overflow, oil rich stream. Oil carry-under may be significantly reduced in the practice of the invention. One way of assisting in reducing oil carry-under is by implementing suitable controls in the underflow. Thus, a control system in the practice of the invention is quite useful in maintaining maximum underflow while at the same time obtaining relatively clear pure water in the underflow, which is highly desirable.

It has been found that when oil/water mixtures are subjected to separation in an LLCC, it is much more efficient and beneficial if the water and oil enter the LLCC in a stratified flow regime. Stratified flow refers to flow in which most of the heavier water is in the lower portion of the stream, and most of the lighter oil is in the upper portion of the stream. Separation performance is greatly enhanced when such a stratified regime is provided, and the substantially horizontal portion of the flow conditioner assists in forming the stratified flow prior to the LLCC.

Coalescing droplets form larger size droplets within the continuous phase. This has been found to be very important in achieving maximum separation efficiency. Further, increasing the diameter of piping in the flow conditioner slows the velocity of the fluid, which contributes to more efficient and complete water and oil separation.

A split ratio is the underflow to inlet flow rate ratio. It is desirable to optimize the split ratio to form an optimal split ratio, which is the particular split wherein maximum free water knockout in the LLCC (or other cyclonic separators) is obtained. However, fluctuations of the inlet water and oil flow rates cause the water cut in the underflow to vary during operations. One objective of using a control system is to maintain the optimal split ratio for different inlet and water flow rates.

An inline coalescing element 172a, 172b, and/or 172c may be employed in the flow conditioner 24, as one option for increasing separation efficiency, as further discussed herein in connection with FIGS. 4-7C. It is believed that an inline coalescing element of this type may be applied successfully in the second section 40 of the flow conditioner 24, which may be operated in a horizontal or substantially horizontal plane to maximize the assistance of gravity in achieving separation. An inline element also can be applied successfully in the first section 38 of the flow conditioner 24, depending upon the configuration.

Any of the devices described herein, or others within the knowledge of those of skill in the art, may be employed to enhance the separation of gas, water, and oil in a multiphase flow. For example, inline coalescing elements 172a, 172b, and/or 172c may contain a coating fixed upon the surface of the element to enhance the coalescing activity. Such a coating may be oleophilic or oleophobic, depending upon its location and the specific application. Such coatings may be useful to induce the formation of larger droplet sizes in the continuous phase, prior to the liquid-liquid cyclonic separator, to enhance its separation efficiency. The number and orientation of such devices will vary depending upon the specific applications, and the invention is not limited to any particular number or configuration. In one embodiment, there may be only one inline coalescing element. In other embodiments, there may be two or three inline coalescing elements, with the first element being uncoated and adapted for stabilizing flow and a second and/or third being coated to further coalesce droplets in the flow stream.

FIG. 1 shows a multiphase separation system 20. Multiphase hydrocarbon streams are delivered to gas/liquid separator 22 where gas is evolved along flowline 32 and liquid proceeds along flowline 34. Gas passes differential dielectric sensor 37 and proceeds through gas control valve 54. Differential dielectric sensor 37 allows determination of the amount of liquid carried over via computer display 29. A level controller 56 monitors via computer display 29 the flow characteristics, and is capable of sending signals along control line 60 to control gas control valve 54 to open or close the valve as required to adjust the flow. Liquids proceeding along flowline 34 past the differential dielectric sensor 36 pass to the flow conditioner 24. Differential dielectric sensor 36 (or some alternative sensor) is used in this location to obtain a measurement, and it detects the fluid distribution that allows determination of the water, oil and gas carry-under from the gas-liquid separator 22. Additional measurements may add information useful for content of the flow. Differential dielectric sensor 36 is connected to the control system 52, and is useful for fine tuning bubble size distribution or to provide an instantaneous measurement of the gas volume fraction in the gas/liquid separator 22 for early detection signal of water content in the flow. If necessary, control system 52 sends signals to second control valve 50 to adjust flow.

Flow conditioner 24, as shown in FIG. 1, assists in increasing the size of droplets held in the continuous phase prior to the liquid-liquid cyclonic separator 26. Flow conditioner 24 is comprised of a first section coalescer 38 and a second section coalescer 40. The first section coalescer includes in this particular embodiment a first pipe 39 which is enlarged in comparison to flowline 34 and has the intended effect of slowing flow stream velocity to assist in coalescing droplets dispersed in the continuous phase. Furthermore, the substantially vertical angle of the first pipe 39 as shown in FIG. 1 assists in slowing and coalescing the droplets (in the oil continuous phase situation). It is beneficial in some applications for the first pipe 39 to be vertical, or at least substantially vertical, or in other instances deviating from vertical to no more than about 45 degrees as measured from vertical. A second pipe 41 receives fluid from the first pipe 39. The second pipe 41 may be oriented substantially horizontally, for maximum effectiveness in some applications, but it is not necessary that it be horizontal or nearly horizontal. Oil and water pre-separation or stratification may occur in which the lighter oil tends to accumulate at the top portion of the second pipe 41 and the heavier water tends to be held in the lower section part of the flow.

Liquid-liquid cyclonic separator 26 divides liquid flow into two portions, one that proceeds along oil dominated flowline 28 and another that proceeds along water dominated flowline 30. Flowline 30 also comprises differential dielectric sensor 43, which functions to provide underflow watercut measurement and additional information other meters may not be able to provide. Other sensors or combinations of multiple sensors in other applications of the invention could be used instead of a differential dielectric sensor to determine the oil concentration in the water. Electronic signals are sent from differential dielectric sensor 43 to the control system 52, and when necessary, signals are sent to second control valve 50 to adjust flow. Differential dielectric sensor 43 provides an early oil detection system.

Liquid-liquid cyclonic separators operate using centrifugal forces caused by the swirling motion of the fluid entering fluid, and by operation of gravity. Heavier water is forced radially outward toward the cyclone wall and is collected from below, while the lighter oil moves towards the center of the cyclone and is taken out from the top. This type of device provides an efficient and compact mechanism for oil-water separation.

A Coriolis flow meter 46, or similar device, measures oil concentrated flow to first control valve 49. A computer display 35 reveals the data collected, and when necessary signals are sent along pressure control line 58 to open or close valve 49. Water content in the oil dominated flow is monitored with differential dielectric sensor 44 on computer display 35. On the water dominated side, water concentrated flows past differential dielectric sensor 43, and then past the Coriolis flow meter 47. Electronic signals are sent from meter 47 to the control system 52, and when necessary, signals are sent to second control valve 50 to adjust flow. A feedback control algorithm is used as the default to control the quality of the water rich stream coming from the underflow from the liquid-liquid cyclonic separator 26. The feedback control system takes an error signal obtained by the difference between the underflow watercut set point and introduces this into a PID controller (not illustrated). The controller then sends a signal to a control valve 50 to modify its opening and area open to flow. This modifies the system pressure balance and the distribution of liquid streams flowing through the overflow and underflow legs. Since the variable modified by the control system affects directly the underflow flow rate, the liquid-liquid cyclonic separator 26 will respond to such changes depending on its performance and provide a corresponding underflow watercut with a given efficiency or split ratio. The oil content in the water dominated flow may be continuously monitored with dielectric sensor 43 and flow meter 47, which allows control system 52 to match a pre-determined oil content set point in the water dominated flow by opening and closing control valve 50. If the oil content exceeds the set point, control valve 50 is closed forcing more flow to oil dominated flowline 28. If the oil content is below the set point, control valve 50 is opened to allow more flow to water dominated flowline 30. Dielectric sensor 43 provides an early oil detection signal to control system 52, and when necessary, signals are sent to second control valve 50 to adjust flow.

Figure 2:
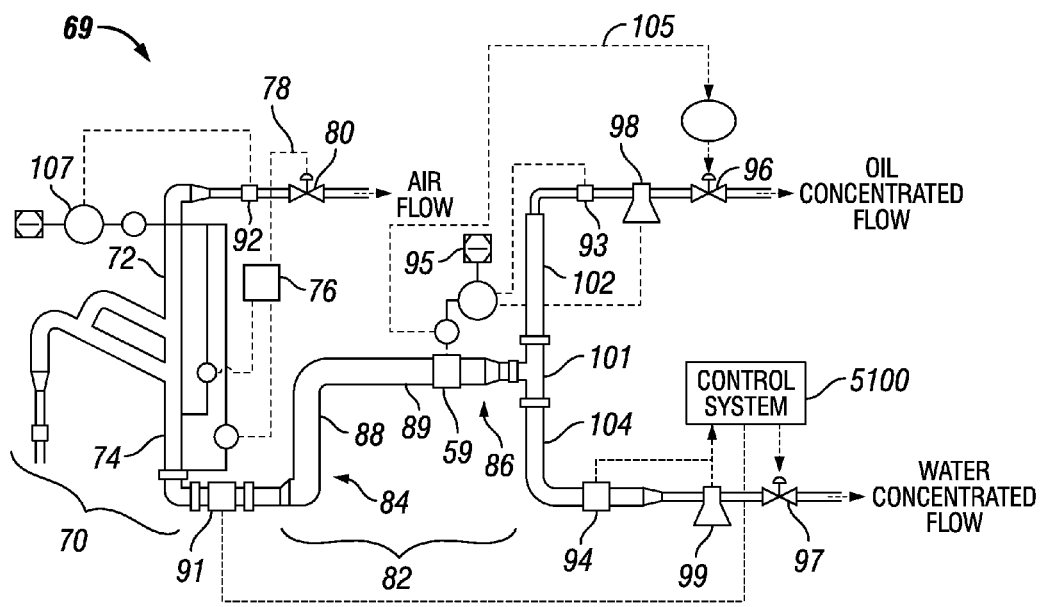
FIG. 2 illustrates a different embodiment of the invention for separating water from a multiphase hydrocarbon production stream with a gas/liquid separator, a liquid-liquid cyclonic separator and a flow conditioner located between the two separators.

FIG. 2 shows an alternate embodiment of the invention in which the second section 86 of the flow conditioner 82 comprises a second pipe 89 which is expanded to further slow the fluid flow along the second pipe 89. This configuration may be particularly useful when additional coalescing of droplets is needed in the flow conditioner 82, shown in FIG. 2.

FIG. 2 shows a separation system 69. Multiphase hydrocarbon streams are delivered to the gas/liquid separator 70 where gas is evolved along flowline 72 and liquid proceeds along flowline 74. Gas passes differential dielectric sensor 92 and proceeds through gas control valve 80. A level controller 76, monitors flow characteristics shown on computer display 107, and is capable of sending signals to control gas control valve 80 along control line 78 to open or close the valve 80 as required to adjust the flow. Liquids proceeding along flowline 74 and past the differential dielectric sensor 91 then pass to the flow conditioner 82. Differential dielectric sensor 91 would typically have the same or similar function as differential dielectric sensor 36 (described herein). Differential dielectric sensor 37 and 92 have the same function which is to provide insight on the amount of liquid carry-over in the gas/liquid separator 22, 70 respectively. Differential dielectric sensor 92 allows determination of the amount of liquid carried over via computer display 107. Differential dielectric sensor 91 detects the fluid distribution and allows determination of the water, oil and gas content of the flow and also is connected to control system 5100 to provide an early detection signal of water content in the flow. Control system 5100, if necessary, sends signals to control valve 97 to adjust flow.

Flow conditioner 82, as in FIG. 2, assists in increasing the size of droplets held in the continuous phase prior to the liquid-liquid cyclonic separator 101. Flow conditioner 82 is comprised of a first section coalescer 84 and a second section coalescer 86. The first section coalescer 84 includes first pipe 88 which is enlarged in comparison to flowline 74, which has the intended effect of slowing flow stream velocity to assist in coalescing droplets in the continuous phase. Furthermore, the substantially vertical angle of the first pipe 88 as shown in FIG. 2 assists in slowing and coalescing the droplets to increase droplet size (primarily in oil continuous situations). It is beneficial in some applications for the first pipe 88 to be vertical, or at least substantially vertical, i.e. in some instances deviating from vertical to no more than about 45 degrees (angle as measured from vertical). A second pipe 89 receives fluid from the first pipe 88. The second pipe 89 may be oriented substantially horizontally, for maximum effectiveness, but it is not necessary that the second pipe 89 be horizontal or nearly horizontal.

In the embodiment of FIG. 2, the second pipe 89 is expanded in diameter in comparison to flowline 74, and may be comparable in size to first pipe 88, which results in a velocity reduction in fluid flow through second pipe 89. Such velocity reduction may enhance the coalescence of droplets in second pipe 89 allowing for its required length to be shorter, and contributing to the minimization in size of the overall system. Oil and water separation in which the lighter oil tends to accumulate at the top portion of the pipe and the heavier water tends to be held in the lower part of the flow may occur in second pipe 89. In some embodiments of the invention, the first pipe 88 may not be required.

FIG. 2 shows liquid-liquid cyclonic separator 101, which divides liquid flow into two portions, one that proceeds along oil dominated flowline 102 and another that proceeds along water dominated flowline 104. Flowline 102 also comprises differential dielectric sensor 93 that allows determination of water content in oil dominated flow and reporting via computer display 95, while flowline 104 comprises differential dielectric sensor 94, which functions to determine the oil concentration in the water. Electronic signals are sent from differential dielectric sensors to liquid-liquid cyclonic separator 101. This may occur when significant amounts of gas carry-under from the gas-liquid separator is transported along the other separation stages downstream. When necessary, signals are sent to second control valve 97 to adjust flow. Differential dielectric sensor 94 provides an early oil detection system.

A Coriolis flow meter 98, or similar device, measures oil concentrated flow to first control valve 96. A computer display 95 reveals the data collected, and when necessary sends signals along pressure control line 105 to adjust the valve 96 by opening or closing valve 96. On the water dominated side, water concentrated flow moves past the Coriolis flow meter 99, and electronic signals are sent from the meter 99 to the control system 5100. When necessary the control system 5100 sends signals to second control valve 97 to adjust flow.

The oil content in the water dominated flow is continuously monitored with dielectric sensor 94 and flow meter 99 which allows control system 5100 to match a pre-determined oil content set point in the water dominated flow by opening and closing control valve 97. If the oil content exceeds the set point, control valve 97 is closed forcing more flow to shunt to the oil dominated flowline 102. If the oil content is below the set point, control valve 97 is opened to allow more flow to water dominated flowline 104. Dielectric sensor 94 provides an early oil detection signal to control system 5100, and when necessary, signals are sent to second control valve 97 to adjust flow.

Figure 3:
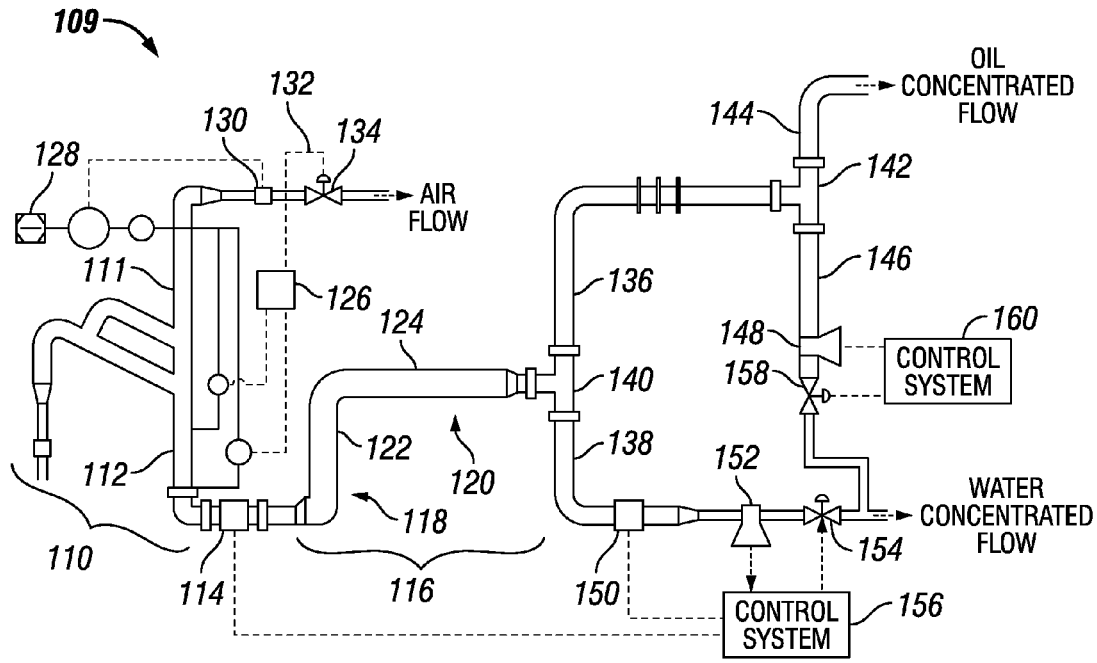
FIG. 3 illustrates yet another embodiment of the invention for separating water from a multiphase hydrocarbon production stream in which the flow conditioner employs a configuration with an enlarged first section and an enlarged second section.

FIG. 3 shows a separation system 109 characterized by the employment of two separate liquid-liquid cyclonic separators 140, 142. The employment of two liquid-liquid cyclonic separators assist in achieving a substantially improved and more complete separation of oil and water, in some situations. First, the multiphase hydrocarbon streams are delivered to the gas/liquid separator 110 where gas is evolved along flowline 111 and liquid proceeds along flowline 112. Gas passes differential dielectric sensor 130 and proceeds through gas control valve 134. A level controller 126 is operatively connected to computer display 128, and is capable of sending signals along control line 132 to control gas control valve 134 to open or close the valve as required to adjust the flow. Liquids proceeding along flowline 112 past the differential dielectric sensor 114 proceed to the flow conditioner 116.

Flow conditioner 116, as shown in FIG. 3, assists in increasing the size of droplets held in the continuous phase prior to the liquid cyclonic separator 140. Flow conditioner 116 is comprised of a first section coalescer 118 and a second section coalescer 120. The first section coalescer includes first pipe 122 which is enlarged in comparison to flowline 112 which has the intended effect of slowing flow stream velocity to assist in coalescing droplets in the continuous phase. Furthermore, the substantially vertical angle of the first pipe 122 as shown in FIG. 3 assists in slowing and coalescing the droplets. It is beneficial in some applications for the first pipe 122 to be vertical, or at least substantially vertical, i.e. deviating from vertical to no more than about 45 degrees (angle as measured from vertical). A second pipe 124 receives fluid from the first pipe 122. The second pipe 124 may be oriented substantially horizontally, for maximum effectiveness, but it is not necessary that it be horizontal or nearly horizontal. And, the first pipe 122 is optional, as some applications may not require a first pipe 122, depending upon flow characteristics.

In the embodiment of FIG. 3, the second pipe 124 may be expanded in diameter in comparison to flowline 112, and is typically comparable or roughly comparable to the diameter of first pipe 122 which results in additional velocity reduction in fluid flow through second pipe 124. Oil and water separation into the lighter oil which tends to float near the surface and the heavier water which tends to be held in the lower one-half of the flow may occur in second pipe 124, and this effect may be monitored.

Liquid-liquid cyclonic separator 140 divides liquid flow into two portions, one that proceeds along oil dominated flowline 136 and another that proceeds along water dominated flowline 138. Flowline 138 comprises along its length differential dielectric sensor 150, which exhibits essentially the same function as differential dialectric sensors 94 or 43, described herein. Electronic signals are sent from differential dielectric sensor 150 to the control system 156, and when necessary, signals are sent to control valve 154 to adjust flow.

In the embodiment of FIG. 3 oil concentrated flow proceeds along flowline 136 and once passing through liquid-liquid cyclonic separator 142, such oil concentrated flow proceeds along flowline 144.

On the water dominated side, water flows along flowline 138 and past differential dielectric sensor 150, and then past the Coriolis flow meter 152. Electronic signals are sent from the Coriolis meter 152 to the control system 156, which when necessary, sends control signals to first control valve 154 to adjust flow. Likewise, water flow coming from the second liquid-liquid cyclonic separator 142 flows along flowline 146 to Coriolis meter 148. Coriolis meter 148 sends signals to control system 160, and the control system may send signals to second control valve 158 as needed to adjust flow through the second control valve 158.

Figure 4:
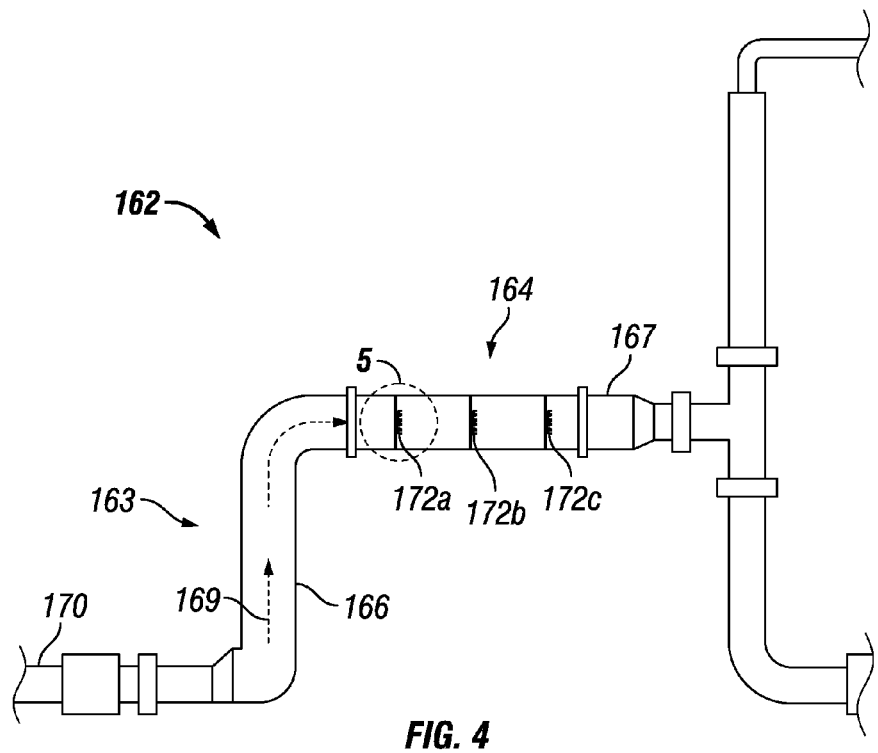
FIG. 4 illustrates the employment of several inline coalescing elements within the flow conditioner prior to the liquid-liquid cyclonic separator.

FIG. 4 illustrates the optional employment of one or more inline coalescing elements within the flow conditioner prior to the liquid-liquid cyclonic separator, and could be employed in any of the embodiments described in FIG. 1, FIG. 2, FIG. 3, or other embodiments, prior to a first cyclonic separator or prior to a second cyclonic separator, or both. Such optional employment of inline coalescing elements could occur with anywhere from one such element to eight or ten elements, depending upon the configuration, and could be applied in embodiments that employ one, two, or more cyclonic separators. However, for many applications, a series of carefully selected elements provide the maximum amount of stabilization to the flow and achieve superior separation downstream.

As shown in FIG. 4, flow conditioner 162 comprises a first coalescing section 163 and a second coalescing section 164. The first coalescing section 163 includes a first pipe 166 which is of enlarged cross-section (typically 3 inches in diameter) as compared to flowline 170. This enlargement of the first pipe 166 causes a reduction in velocity of the hydrocarbon/water mixture flowing along the first pipe 166, which encourages the coalescence of droplets in the continuous phase of the fluid. Fluid flow path 169 shows the pathway for fluid which proceeds substantially vertically along first pipe 166 to second pipe 167, which is substantially horizontal. In the particular embodiment of FIG. 4 the second pipe 167 is of enlarged cross-section to further reduce the velocity of fluid flow. Several inline coalescing elements 172a, 172b, and 172c are shown, one of which (i.e. 172a) is shown in greater detail in FIG. 5. It should be recognized that zero, one, two, three, or more elements may be useful in the second pipe 167, depending upon the fluid flow characteristics and the configuration required. The purpose of such elements is to stabilize turbulent flow and to "settle" the fluid, to encourage the separation of oil and water in subsequent cyclonic separation steps. Also, in some instances, it may be desirable to provide inline coalescing elements in the first pipe 166 to coalesce and simplify the upward flow along first pipe 166.

Figure 5:
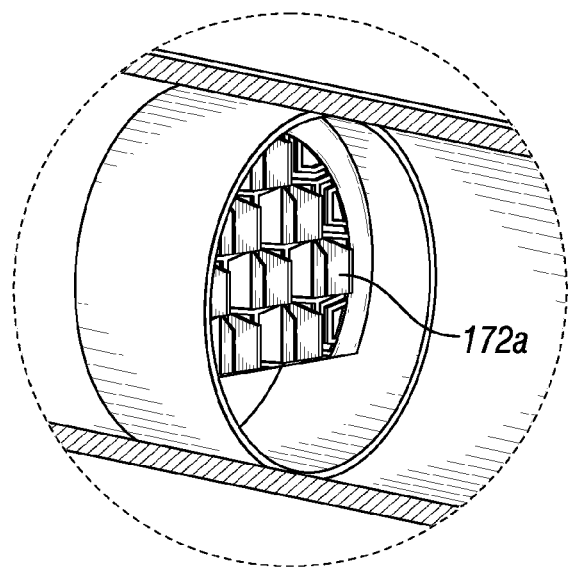
FIG. 5 shows an inline coalescing element of the insertion panel type.

The element 172a in this instance, as shown in FIG. 5, may be an insertion panel type of element. Thus, the element 172a as shown in FIG. 5 is comprised of a lattice intercepting the fluid as it flows through the lattice, but the lattice will not impede the fluid flow so as to restrict volume of fluid passed through the system. One such panel that is available in the marketplace is the VIP™ (Vortab Insertion Panel) flow conditioner manufactured and distributed by the Vortab Company of La Costa, Calif. In some embodiments, the element 172a is open at its bottom portion, so as not to impede progress of the heavier water or solid particles that may settle to the lower portion of the stream.

In some embodiments of the invention, an oleophilic or oleophobic coating (as required or as desirable) may be used on one or more elements and in contact with the fluid flow to further encourage the formation of larger droplet size formation prior to the subsequent liquid cyclone separation. Such a coating can be electroplated or otherwise adhered to the panel of the insertion panel type of element, as one example. The coating may be electroplated upon a metallic insertion panel element in some applications. Such a coating may be employed in connection with any of the elements disclosed herein, and a coating could be applied or adhered to the element in essentially any manner.

Figure 6A:
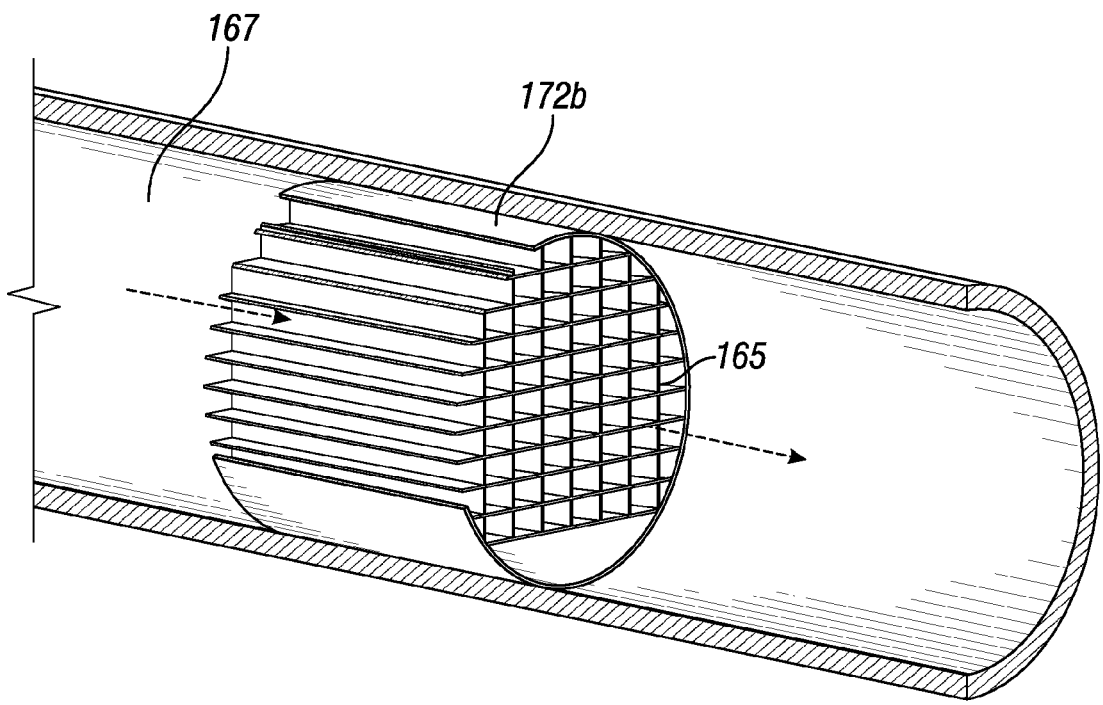
FIG. 6A illustrates another embodiment of an inline coalescing element.
Figure 6B:
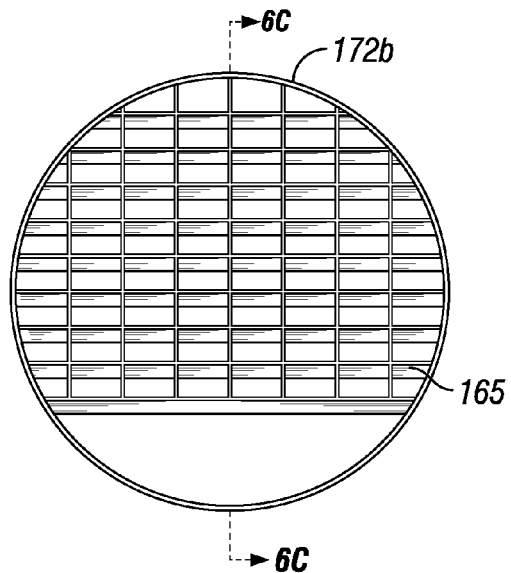
FIG. 6B shows a front view of the element of FIG. 6A.
Figure 6C:
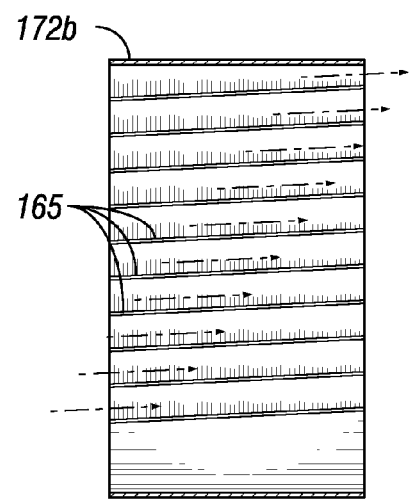
FIG. 6C shows a side cross-sectional view of the element of FIG. 6A.

In another embodiment of the invention, as shown in FIG. 6A, flowline 167 could contain one or more inline coalescing elements 172b of the type that are characterized by "tunnels" or slots in parallel. Such elements 172b may serve the purpose of calming flow to settle the fluid into heavier water below and lighter oil above. Such an element 172b may assist in achieving good separation in the subsequent step in a liquid-liquid cyclonic separator. FIG. 6B shows a front view of element 172b. FIG. 6C shows a side cross-sectional view of element 172b. Element 172b may employ internal plates 165. Internal plates 165 in the horizontal direction may be oriented slightly upward at an angle of between about zero degrees and about 30 degrees adjacent the oil portion of the flow (i.e. upper portion), and may include a downward angle of plates 165 of between about zero degrees and about 30 degrees in the water portion of the flow (i.e. lower portion). However, in other embodiments, the plates may be parallel to the flow path. The element 172b may be welded or alternately may be sandwiched between flanges (not shown) to secure it in place.

In one embodiment of the invention, inline coalescing elements 172a, 172b, and 172c may be employed in series, as shown in FIG. 4. In one particular embodiment the element 172b would be a metallic element with an oleophilic coating on the plates 165 in the oil portion of the flow (upper plates) in a configuration similar to that shown in FIG. 6A-6C. Further, in that same embodiment, the inline coalescing element 172c could be provided with an oleophobic (i.e. hydrophilic) coating on the plates 168 (See FIGS. 7A-7C). In this manner, the oil droplets would be coalesced at inline coalescing element 172b, and the water droplets would be coalesced at inline coalescing element 172c. It should be recognized that any number and any configuration of inline coalescing elements may be employed.

In other embodiments of the invention, ceramic coatings could be employed in the inline coalescing elements, including for example inline coalescing elements 172a, 172b, and 172c.

Figure 7A:
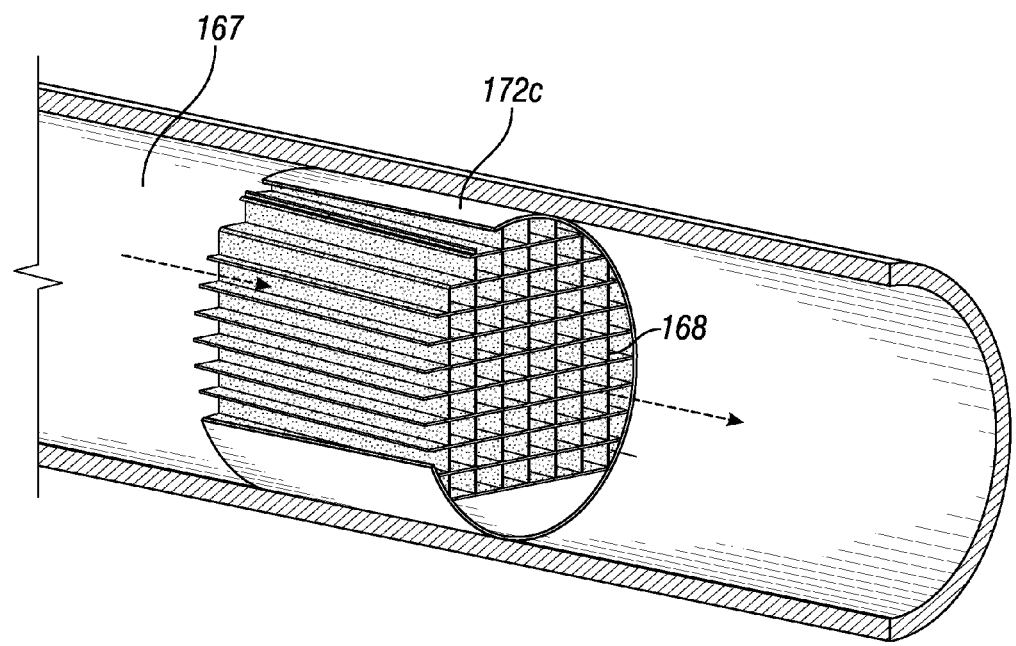
FIG. 7A illustrates another inline coalescing element.
Figure 7B:
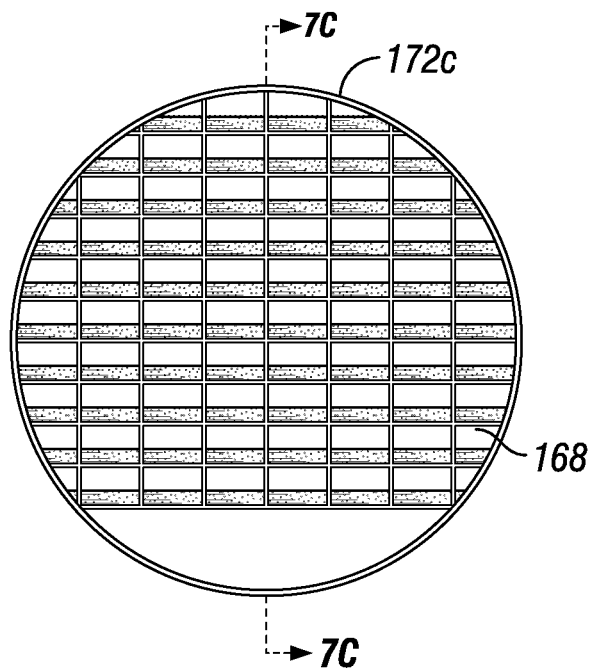
FIG. 7B shows a front view of the element of FIG. 7A.
Figure 7C:
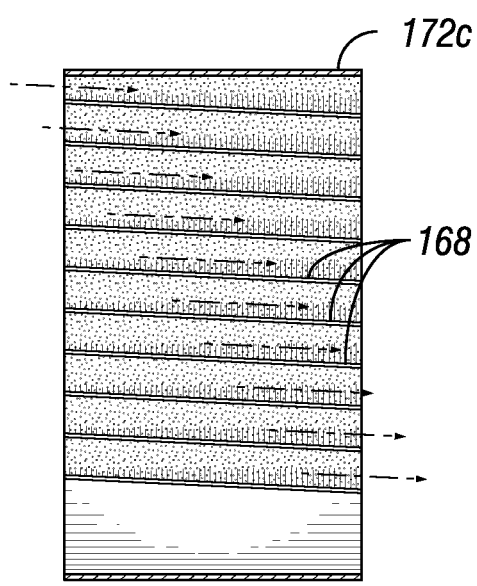
FIG. 7C shows a side cross-sectional view of the element of FIG. 7A.

FIG. 7A shows flowline 167 with an optional inline coalescing element 172c (third element). Such an element 172c may be similar in structure to that of element 172b but could be coated in any manner found to be helpful in separating oil and water in the flow stream. FIG. 7B shows a front view of element 172c, and FIG. 7C shows a side view of element 172c. Element 172c may employ internal plates 168. Internal plates 168 also may or may not be oriented slightly downward at an angle of between about zero degrees and about 30 degrees. However, in other embodiments, the plates may be parallel to the flow path depending upon the application.

Figure 8:
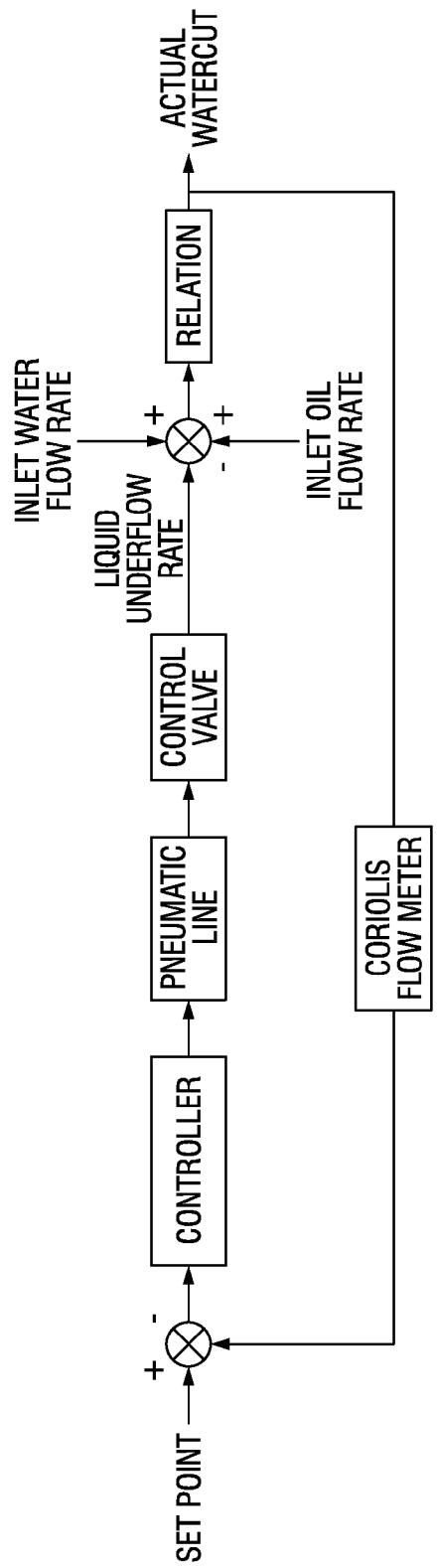
FIG. 8 is a schematic showing one manner of providing feedback control in the practice of the invention.

A block diagram of an underflow watercut control loop using a control valve at the water outlet is shown in FIG. 8. A sensor, such as a Coriolis mass flow meter or microwave watercut meter may be employed, although it is recognized that other sensor designs could work as well. The meter measures the control parameter, i.e. the underflow watercut, and directly converts the watercut signal into current signal. This current signal is compared with the water cut set point (predetermined) and an error signal may be sent to the controller. The controller output may be sent to the control valve to control the valve position. A control system may include an error signal, PID type controller, sensor, actuator, and a control valve. The error signal is acquired by the watercut meter of choice and represents the difference between the measured watercut and a predetermined watercut setpoint or desired watercut for which the control system corrects the valve opening until eventually minimizing the error. The setpoint may be a fixed value given a desired quality or watercut constant in time, or may be the output from a higher level algorithm that adjusts the setpoint in time as other variables in the system change. For example, the inlet watercut could be used to decide the best underflow watercut setpoint. There are a combination of parameters assigned to the PID controllers and setpoints through a control algorithm.

Various types of inline conditioning element(s) may be employed, as discussed herein, depending upon the flow parameters and the application. A VIP™ (Vortab Insertion Panel) stainless steel insertion panel flow conditioner may serve to neutralize the flow profile irregularities that may be caused by elbows, valves, blowers, compressors and other flow disturbances that occur in piping and duct runs. This device may allow the turbulence intensity to decrease while maintaining a fairly repeatable velocity profile. This particular design is useful in applications in which pressure loss is a problem or issue in the system.

In other applications of the invention, a plate pack or corrugated plate pack type of structure such as for example the ENVIRO-SEP™ product sold and distributed by Enviro-Tech Systems of Covington, La. could be employed inline to stabilize fluid flow.

Furthermore, it is recognized that one or more of the types of elements discussed herein may be used in combination with each other, and in any number of one or the other, as required for a given specific application, to achieve the flow properties that are needed in a given application or flow regime.

Testing and Data

Tests were performed on an integrated system of employing a gas-liquid cylindrical cyclone ("GLCC") separation followed by a liquid-liquid cylindrical cyclone ("LLCC") separation. In this particular test, a flow conditioner was applied between the gas-liquid cyclonic separator (GLCC) and the liquid-liquid cyclonic separator (LLCC).

Testing was accomplished in an experimental facility with a basic layout similar to that shown in FIG. 1. Geometry as per facility design was 2"Ø-1 feet long GLCC outlet-after valve, 3"Ø-3 feet long CFC, 2"Ø-5 feet long LLCC inlet. A Sauter mean diameter (d32) v. length as a function of CFC diameter (Vsl=ft/s) was employed. Due to the lack of direct measurements to the CFC (flow conditioning section), modeling was performed to predict the behavior of droplets in this section. The mean droplet size (d32) of a distribution of droplets flowing through a flow conditioning section evolves along the flow path in the facility. A first pipe 39 with enlarged cross-section (see FIG. 1) was employed to enhance the coalescence process. The increased droplet size at the coalescer outlet location was observed for the embodiments that employed 3 inch and 4 inch diameter first pipe 39 as compared to a conventional 2" diameter piping pipe which would correspond to conventional sized pipe.

The invention is shown and described herein, illustrated in various exemplary forms in the accompanying drawings, and is described in various embodiments in the appended claims.

The invention claimed is:

1. A water separation system for multiphase hydrocarbon production streams, the system comprising:
   (a) a gas/liquid separator to separate the multiphase hydrocarbon production stream into a gas stream and a liquid stream, the liquid stream being comprised of droplets within a continuous phase;
   (b) a flow conditioner in fluid communication with and positioned downstream from the gas/liquid separator, the flow conditioner being configured for increasing the average droplet size, the flow conditioner further comprising a first section and a second section, wherein the first section of the flow conditioner comprises a coalescer having a first pipe of enlarged cross-section to reduce the velocity of the liquid stream;
   (c) an inline coalescing element within the flow conditioner, the inline coalescing element comprising a lattice of tunnels or slots, the inline coalescing element being adapted for separating lighter oil and heavier water;
   (d) a first cyclone separator in fluid communication with and positioned downstream from the flow conditioner, the first cyclone separator being capable of dividing the liquid stream into an oil dominated portion and a water dominated portion; and
   (e) a second cyclone separator in fluid communication with and positioned downstream from the first cyclone separator, the second cyclone separator being capable of extracting water from the oil dominated portion to further reduce the percentage of water in the oil dominated portion.

2. The system of claim 1 further comprising a first control system adapted for adjusting the efficiency of separation in the first cyclone separator.

3. The system of claim 2 wherein the first control system further comprises a first water quality sensor in communication with a first control valve, wherein the first control system redirects a portion of the flow of the liquid stream to achieve a desired oil/water ratio.

4. The system of claim 2 further comprising a second control system adapted for adjusting the efficiency of separation in the second cyclonic separator.

5. The system of claim 4 wherein the second control system further comprises a second water quality sensor in communication with a second control valve, wherein the second control system redirects a portion of the flow of the oil dominated portion to achieve a desired oil/water ratio.

6. The system of claim 1 wherein the first pipe of the coalescer is oriented at less than a 45 degree angle from vertical.

7. The system of claim 6 wherein the first pipe is oriented substantially vertically.

8. The system of claim 1 wherein the second section of the flow conditioner comprises a second pipe oriented substantially horizontally.

9. The system of claim 8 wherein the second pipe comprises an enlarged cross-section.

10. The system of claim 1 wherein the inline coalescing element is metallic.

11. The system of claim 1 wherein the inline coalescing element comprises an outer coating.

12. The system of claim 11 wherein the outer coating is oleophilic.

13. The system of claim 10 wherein the outer coating is oleophobic.

14. The system of claim 1 wherein the inline coalescing element comprises a polymeric media.

15. The system of claim 1 wherein the inline coalescing element comprises a plate pack.

16. A method of separating water from a multiphase hydrocarbon production stream, the method comprising:
   (a) supplying the multiphase hydrocarbon production stream to a gas/liquid separator to separate the multiphase hydrocarbon production stream into a gas stream and a liquid stream, the liquid stream being comprised of droplets within a continuous phase;
   (b) feeding the liquid stream to a flow conditioner in fluid communication with and positioned downstream from the gas/liquid separator, the flow conditioner being configured for increasing the average droplet size, the flow conditioner further comprising a first section and a second section, wherein the first section of the flow conditioner comprises a coalescer having a first pipe of enlarged cross-section to reduce the velocity of the liquid stream;
   (c) providing an inline coalescing element within the flow conditioner, the inline coalescing element comprising a lattice of tunnels or slots, the inline coalescing element being adapted for separating lighter oil and heavier water;
   (d) sending the liquid stream from the flow conditioner to a first cyclone separator, the first cyclone separator being capable of dividing the liquid stream into an oil dominated portion and a water dominated portion; and
   (e) delivering the oil dominated portion to a second cyclone separator in fluid communication with and positioned downstream from the first cyclone separator, the second cyclone separator being capable of extracting water from the oil dominated portion to further reduce the percentage of water in the oil dominated portion.

17. The method of claim 16 wherein the inline coalescing element is metallic.

18. The method of claim 16 wherein the inline coalescing element comprises an outer coating.

19. The method of claim 18 wherein the outer coating is oleophilic.

20. The method of claim 18 wherein the outer coating is oleophobic.

21. The method of claim 16 wherein the inline coalescing element comprises a polymeric media.

22. The method of claim 16 wherein the inline coalescing element comprises a plate pack.

* * * * *